United States Patent
Annamalai et al.

(10) Patent No.: US 11,389,753 B2
(45) Date of Patent: Jul. 19, 2022

(54) FILTER ASSEMBLY WITH AN INNER FILTER ELEMENT WITH A TOP RIB

(71) Applicant: Cummins Filtration IP, Inc., Columbus, IN (US)

(72) Inventors: Manikandan Annamalai, Cookeville, TN (US); Saurabh Saboo, Columbus, IN (US); Jayant Singh, Pune (IN); Zemin Jiang, Cookeville, TN (US); Prashant Ramesh Khedkar, Pune (IN); Kevin C. South, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 17/339,038

(22) Filed: Jun. 4, 2021

(65) Prior Publication Data

US 2021/0291084 A1    Sep. 23, 2021

Related U.S. Application Data

(63) Continuation of application No. 16/495,006, filed as application No. PCT/US2018/023084 on Mar. 19, 2018.

(Continued)

(51) Int. Cl.
*B01D 29/58* (2006.01)
*B01D 29/15* (2006.01)
(Continued)

(52) U.S. Cl.
CPC ............ *B01D 29/58* (2013.01); *B01D 29/15* (2013.01); *B01D 35/153* (2013.01); *B01D 35/30* (2013.01);
(Continued)

(58) Field of Classification Search
CPC .... B01D 2201/4046; B01D 2201/4053; B01D 2201/4061; B01D 2201/4076
See application file for complete search history.

(56) References Cited

U.S. PATENT DOCUMENTS

| 4,278,455 A | 7/1981 | Nardi |
| 5,193,579 A | 3/1993 | Bauer et al. |

(Continued)

FOREIGN PATENT DOCUMENTS

| CN | 101311521 A | 11/2008 |
| CN | 102256679 A | 11/2011 |

(Continued)

OTHER PUBLICATIONS

International Search Report and Written Opinion issued for PCT/US2018/023084, dated Jun. 1, 2018, 16 pages.

(Continued)

Primary Examiner — Benjamin M Kurtz
(74) Attorney, Agent, or Firm — Foley & Lardner LLP

(57) ABSTRACT

A filter assembly that comprises a housing, an outer filter element, and an inner filter element. The outer filter element is positionable within the housing and comprises an outer filter media. The inner filter element is positionable within the outer filter element and comprises an inner filter media, a media support structure, an inner top endplate, and an inner bottom endplate. The inner top endplate comprising a top rib that extends continuously around a portion of a top surface of the inner top endplate.

20 Claims, 14 Drawing Sheets

Related U.S. Application Data

(60) Provisional application No. 62/473,687, filed on Mar. 20, 2017.

(51) Int. Cl.
    *B01D 35/153*    (2006.01)
    *B01D 35/30*    (2006.01)
    *F02M 37/42*    (2019.01)
    *F02M 37/48*    (2019.01)
    *F02M 37/24*    (2019.01)
    *F02M 37/34*    (2019.01)
    *B01D 36/00*    (2006.01)

(52) U.S. Cl.
CPC ............ *F02M 37/42* (2019.01); *F02M 37/48* (2019.01); *B01D 2201/04* (2013.01); *B01D 2201/291* (2013.01); *F02M 37/24* (2019.01); *F02M 37/34* (2019.01)

(56) References Cited

U.S. PATENT DOCUMENTS

| | | | |
|---|---|---|---|
| 6,478,958 B1 * | 11/2002 | Beard | B01D 27/02 |
| | | | 210/323.2 |
| 10,047,708 B2 | 8/2018 | Jiang et al. | |
| 10,744,431 B2 | 8/2020 | Gustafson et al. | |
| 2004/0134171 A1 | 7/2004 | Scott et al. | |
| 2005/0000876 A1 | 1/2005 | Knight | |
| 2009/0020465 A1 | 1/2009 | Jiang et al. | |
| 2009/0071892 A1 | 3/2009 | Malgorn | |
| 2009/0230063 A1 | 9/2009 | Hawkins et al. | |
| 2010/0101993 A1 | 4/2010 | Wells et al. | |
| 2010/0294707 A1 | 11/2010 | Abdalla et al. | |
| 2011/0024344 A1 | 2/2011 | Thomas et al. | |
| 2012/0018359 A1 | 1/2012 | Sann et al. | |
| 2012/0024771 A1 | 2/2012 | Abdalla et al. | |
| 2012/0205300 A1 * | 8/2012 | Piva | B01D 29/21 |
| | | | 210/133 |
| 2012/0223006 A1 | 9/2012 | Sann et al. | |
| 2012/0261326 A1 | 10/2012 | Deschamps et al. | |
| 2013/0087497 A1 | 4/2013 | Wells et al. | |
| 2013/0180898 A1 | 7/2013 | Chajec et al. | |
| 2014/0061113 A1 | 3/2014 | Radeva-Tsanova et al. | |
| 2014/0190880 A1 | 7/2014 | Krull | |
| 2016/0222931 A1 * | 8/2016 | Jiang | B01D 29/58 |
| 2016/0258397 A1 | 9/2016 | Jiang et al. | |
| 2016/0296864 A1 | 10/2016 | Shimpi et al. | |
| 2017/0028328 A1 | 2/2017 | Parra et al. | |
| 2017/0252682 A1 | 9/2017 | Gustafson et al. | |
| 2021/0138376 A1 | 5/2021 | Annamalai et al. | |

FOREIGN PATENT DOCUMENTS

| | | |
|---|---|---|
| CN | 102648036 A | 8/2012 |
| CN | 104168973 A | 11/2014 |
| CN | 105611988 A | 5/2016 |
| EP | 2 604 321 | 6/2013 |
| EP | 2 736 620 | 6/2014 |
| WO | WO-2015/042348 A | 3/2015 |
| WO | WO-2018/104416 | 6/2018 |
| WO | WO-2019/159057 | 8/2019 |
| WO | WO-2021/013417 | 1/2021 |
| WO | WO-2021/013638 | 1/2021 |
| WO | WO-2021/013647 | 1/2021 |
| WO | WO-2021/013648 | 1/2021 |
| WO | WO-2021/024091 | 2/2021 |

OTHER PUBLICATIONS

International Search Report and Written Opinion issued for PCT/US2018/041865, dated Sep. 27, 2018, 13 pages.

Non-Final Office Action on U.S. Appl. No. 16/495,006 dated Jun. 9, 2021.

U.S. Office Action issued for U.S. Appl. No. 16/629,855 dated Nov. 10, 2021, 20 pages.

Non-Final Office Action on U.S. Appl. No. 17/338,864 dated Sep. 20, 2021.

* cited by examiner

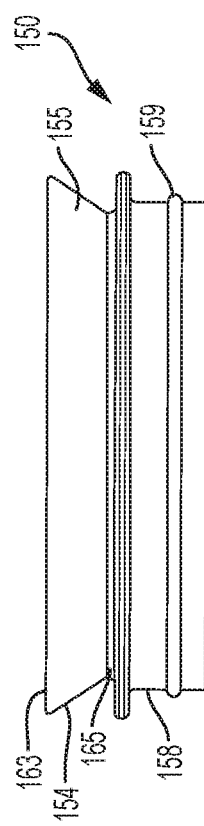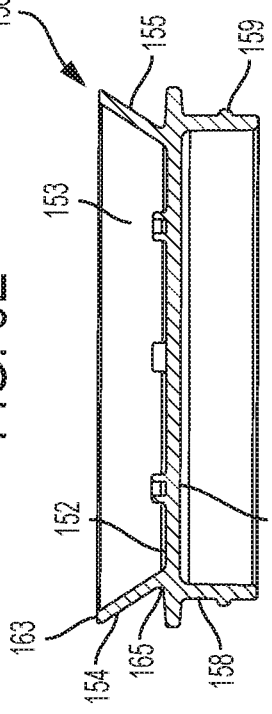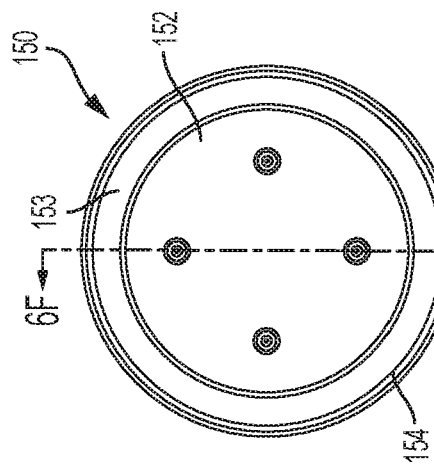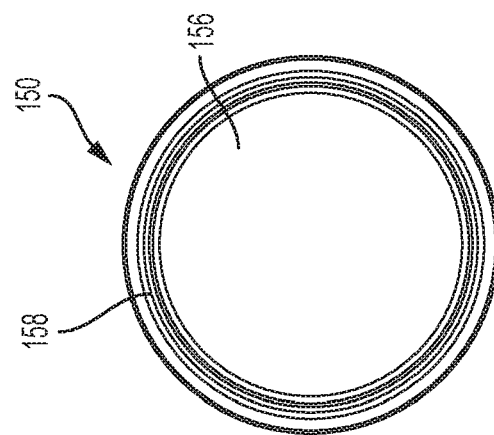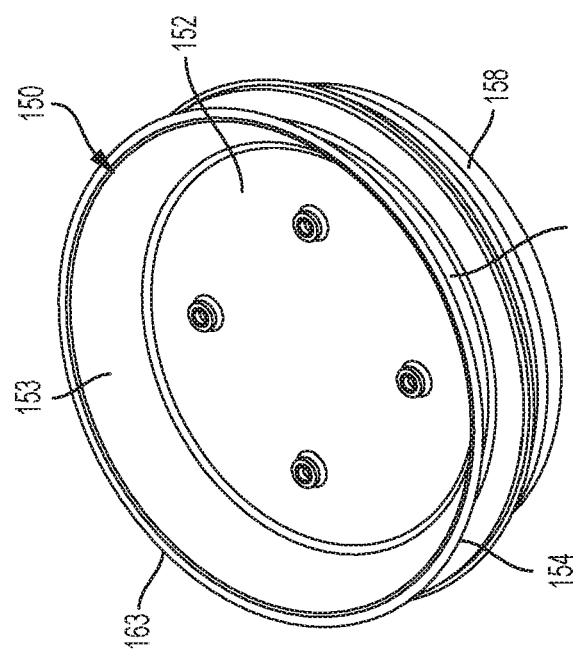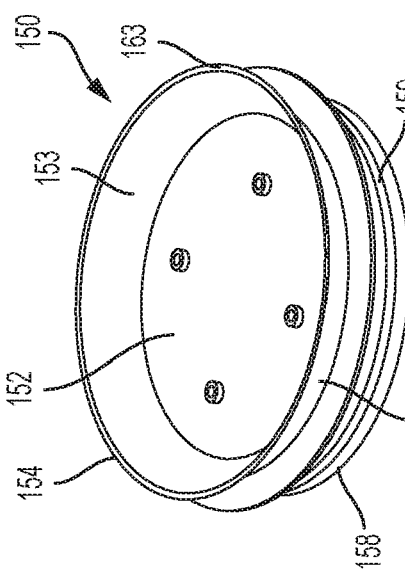

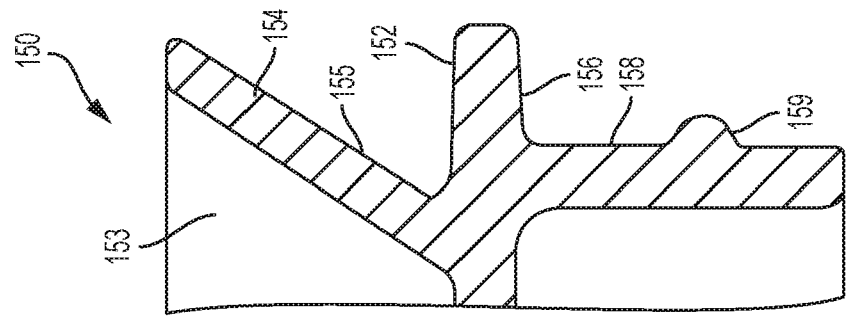
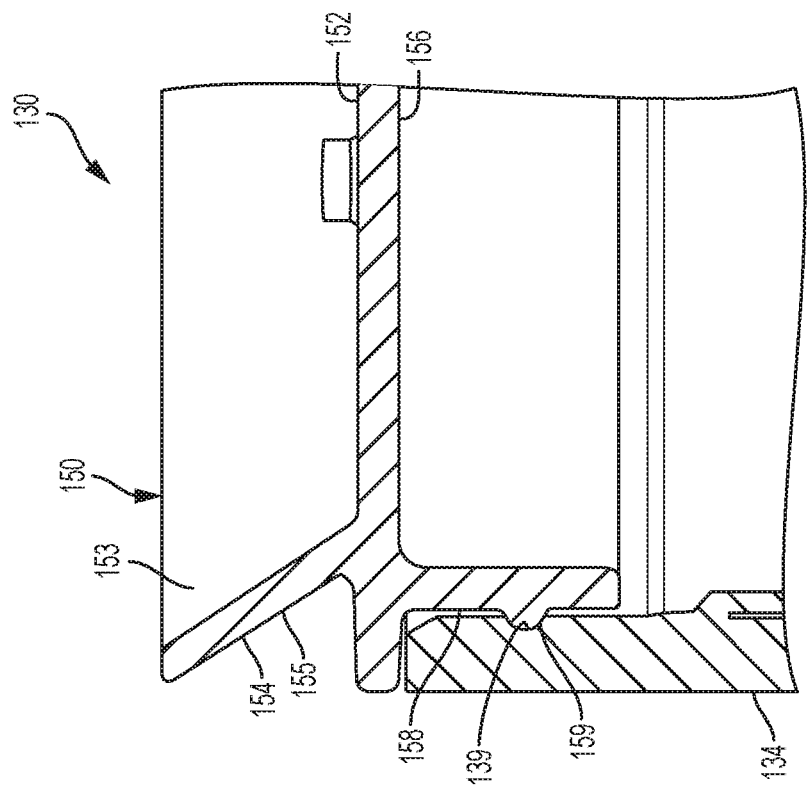

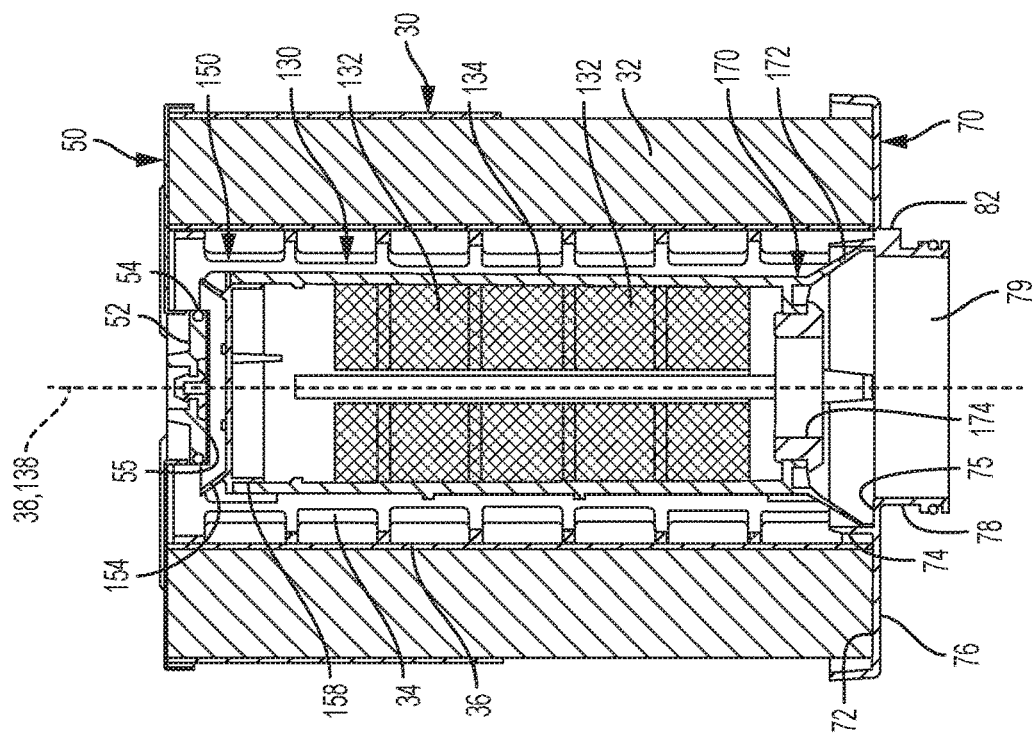
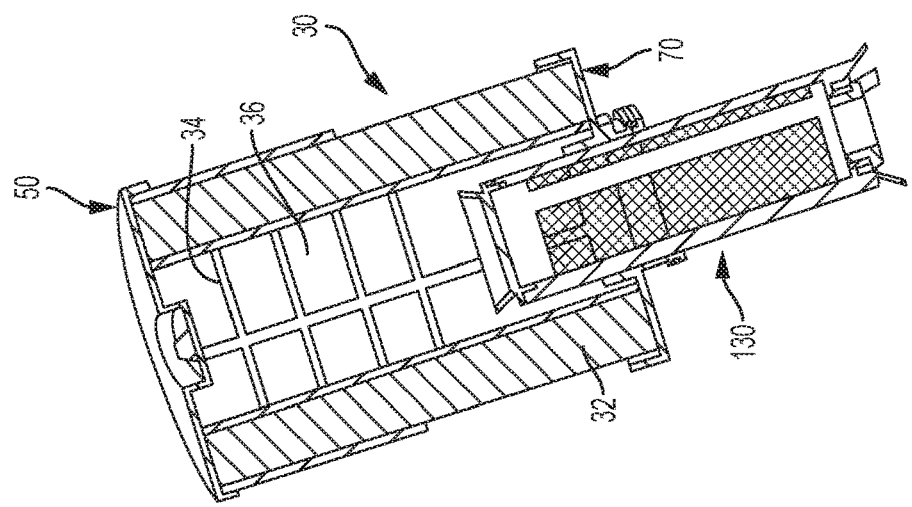
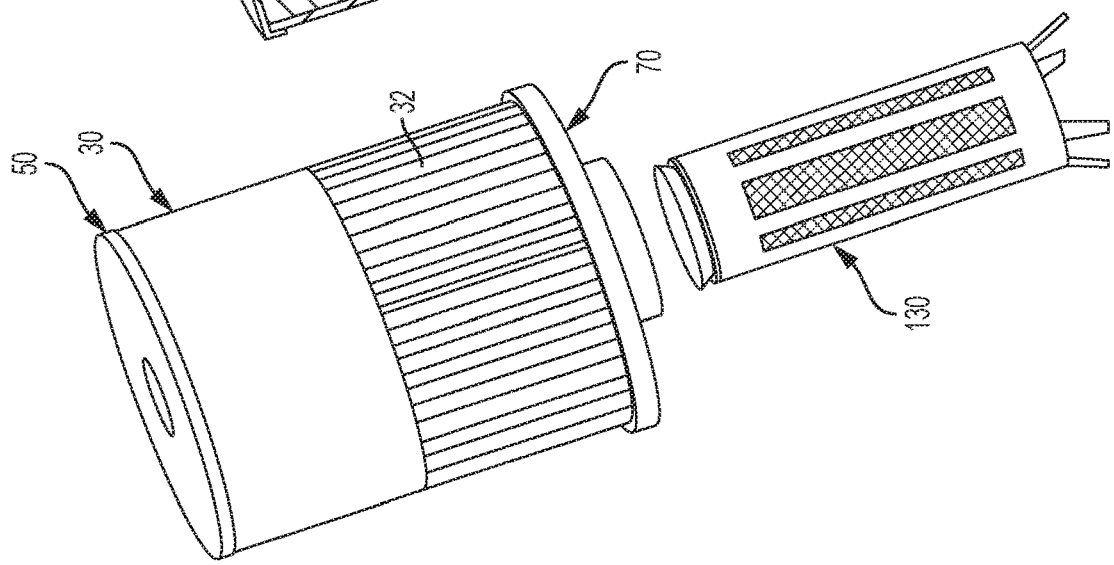

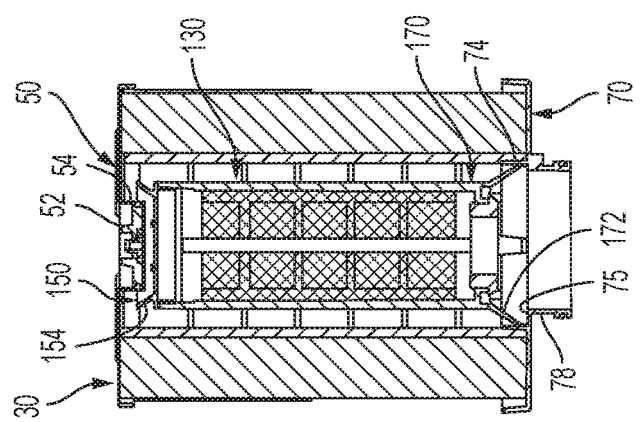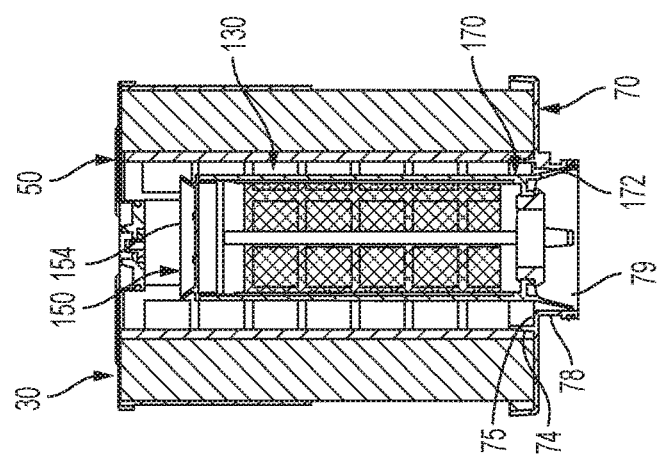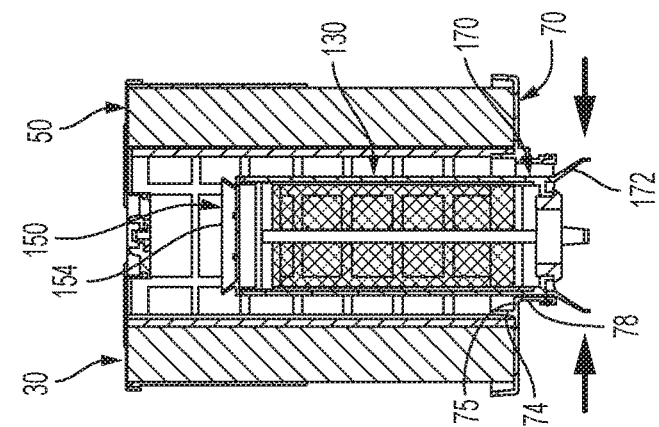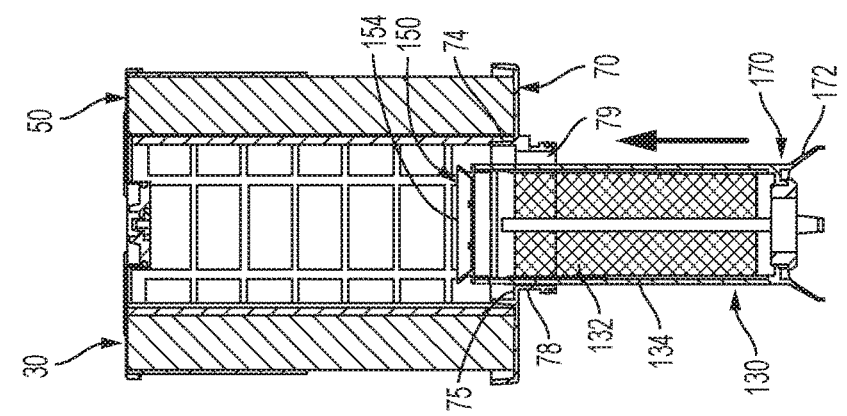

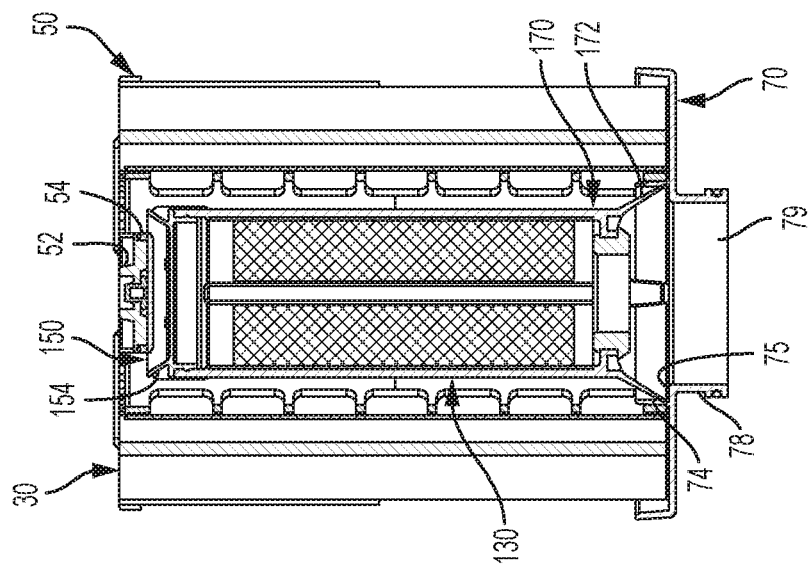
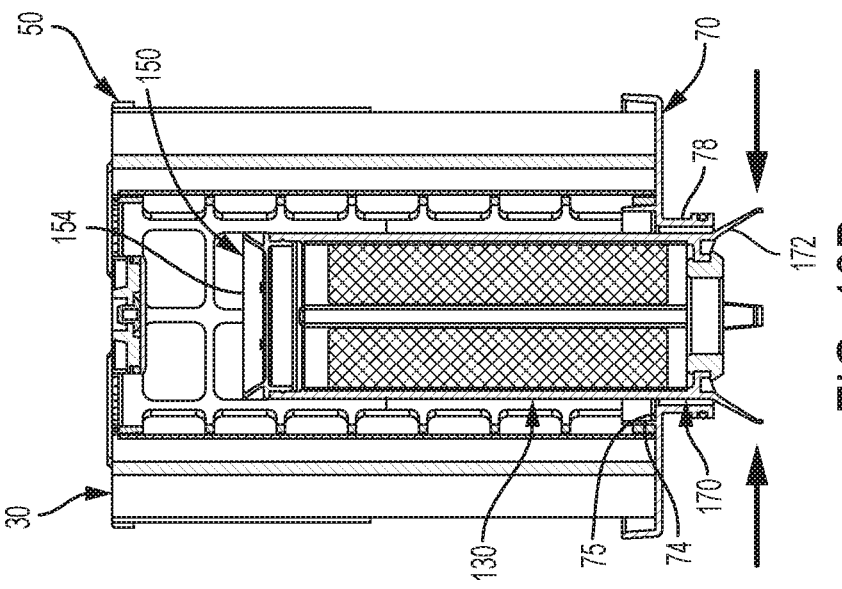
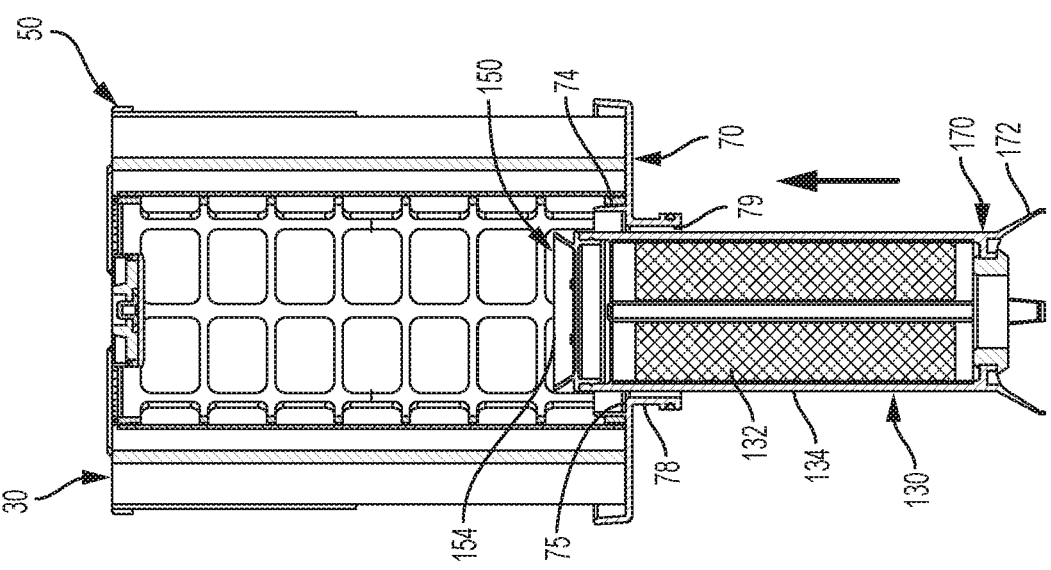
FIG. 10A
FIG. 10B
FIG. 10C

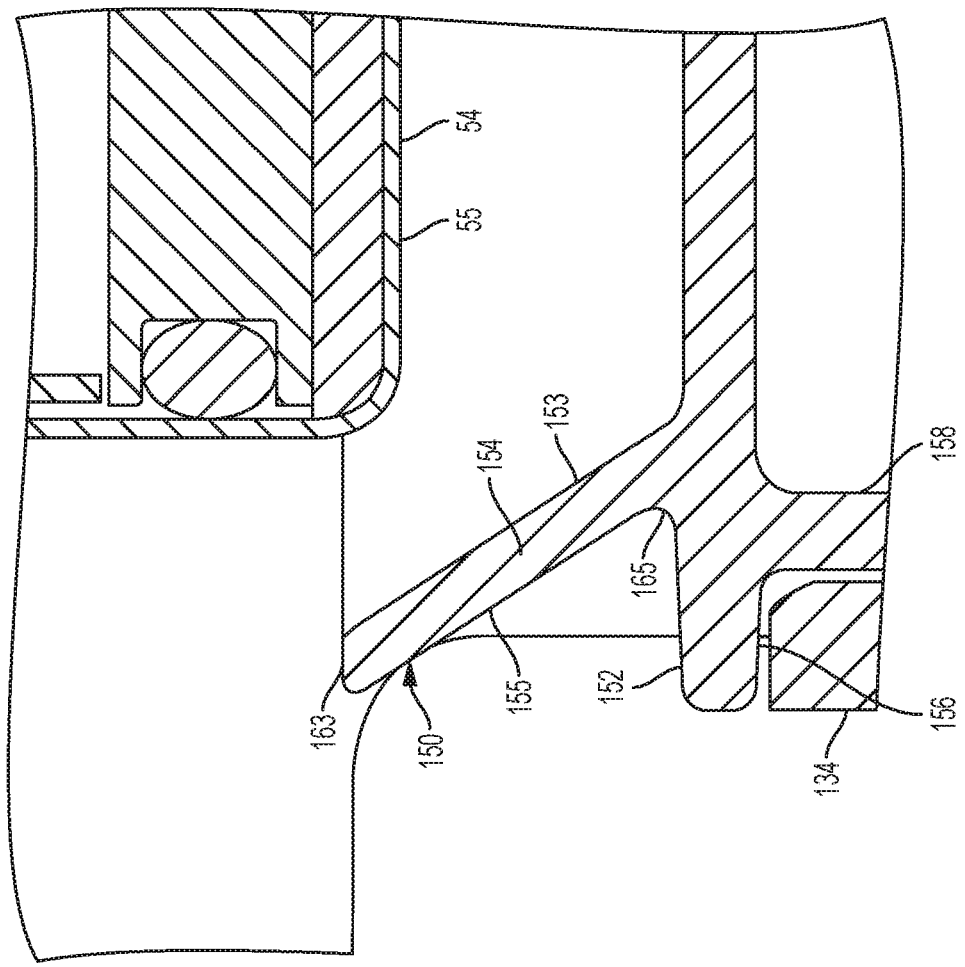

FILTER ASSEMBLY WITH AN INNER FILTER ELEMENT WITH A TOP RIB

CROSS REFERENCE TO RELATED APPLICATIONS

This application is continuation of U.S. patent application Ser. No. 16/495,006, filed Sep. 17, 2019, which is a national stage of PCT Application No. PCT/US2018/023084, filed Mar. 19, 2018 which claims priority to and the benefit of U.S. Provisional Patent Application No. 62/473,687, filed Mar. 20, 2017. The contents of these applications are incorporated herein by reference in their entirety and for all purposes.

FIELD

The present invention relates generally to filter assemblies for use with internal combustion engines or the like.

BACKGROUND

Filter assemblies can be used to filter a variety of different fluids. In order to filter fluid, a number of conventional filter assemblies include an outer filter element and an inner filter element. The inner filter element is positioned within the outer filter element. The inner filter element may have an inner top endplate with legs extending vertically in the longitudinal direction of the inner filter element and in a perpendicular direction to a top surface of the inner top endplate. The legs may be spaced apart from each other such that the legs do not extend continuously around a portion of the inner top endplate.

In such a arrangements, a number of issues can arise while installing the inner filter element within the outer filter element, which makes installation difficult. For example, as the inner filter element is pushed and rotated through the inside of the outer element by an operator or press equipment, the inner filter element may not follow the longitudinal axis of the outer filter element, but instead may be angled within the outer filter element in a variety of different directions relative to the longitudinal axis of the outer filter element during installation. This may cause the legs on the inner top endplate to improperly contact various portions of the outer filter element and potentially get stuck within the outer filter element.

As one example of improper contact, instead of extending around the check valve retainer, the legs may "hit" and bottom out on or get jammed on the check valve retainer on the outer top endplate of the outer filter element, which prevents the inner filter element from being fully inserted into the outer filter element. Additionally, the legs on the inner top endplate of the inner filter element may get stuck or trapped on various other components of the outer filter element, such as the center tube and/or the coalescing wrap. Even further, the legs on the inner top endplate of the inner filter element may pinch off portions of the coalescing wrap of the outer filter element during installation, which makes holes in the coalescing wrap and damages the outer filter element, thereby negatively impacting the filtration performance and the fuel water separation efficiency of the filter assembly.

Each time the inner filter element gets stuck on the outer filter element, the operator may have to remove the inner filter element from the outer filter element and start the installation process over. The inner filter element often cannot be installed within the outer filter element in one attempt, and instead may need to be readjusted or repositioned several times during installation (each of which may damage the outer filter element) until the inner filter element is correctly installed within the outer filter element. This installation process increases product assembly cycle time, which increases the labor and overhead cost and also, therefore, the product cost. Accordingly, extra time, effort, and money is required in order to install the inner filter element in the correct position within the outer filter element of a conventional filter assembly.

SUMMARY

Various embodiments provide for a filter assembly that comprises a housing, an outer filter element, and an inner filter element. The outer filter element is positionable within the housing and comprises an outer filter media. The inner filter element is positionable within the outer filter element and comprises an inner filter media, a media support structure, an inner top endplate, and an inner bottom endplate. The inner top endplate comprises a top rib that extends continuously around a portion of a top surface of the inner top endplate. The top rib guides the inner filter element into and within the outer filter element during assembly.

Various other embodiments provide for an inner filter element positionable within an outer filter element of a filter assembly. The inner filter element comprises an inner filter media, a media support structure, an inner top endplate, and an inner bottom endplate. The inner top endplate comprises a top rib that extends continuously around a portion of a top surface of the inner top endplate. The top rib guides the inner filter element into and within the outer filter element during assembly.

Various other embodiments provide for a method of assembling a filter assembly. The method comprises positioning an inner filter element comprising an inner filter media beneath an outer filter media of an outer filter element, inserting a top rib of an inner top endplate of the inner filter element, and subsequently the inner filter media of the inner filter element, into the outer filter media of the outer filter element, and attaching an inner bottom endplate of the inner filter element to an outer bottom endplate of the outer filter element. The top rib of the inner top endplate of the inner filter element extends continuously around a portion of a top surface of the inner top endplate.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 6A is a top perspective view of an inner top endplate of the inner filter element of FIG. 5A.

FIG. 6B is a top perspective view of the inner top endplate of FIG. 6A.

FIG. 6C is a bottom view of the inner top endplate of FIG. 6A.

FIG. 6D is a top view of the inner top endplate of FIG. 6A.

FIG. 6E is a side view of the inner top endplate of FIG. 6A.

FIG. 6F is a cross-sectional view through section 6F-6F of FIG. 6D.

FIG. 7A is a cross-sectional view of a portion of the inner filter element of FIG. 5A.

FIG. 7B is a cross-sectional view of a portion of the inner filter element of FIG. 5A.

FIG. 8A is a perspective view of an inner filter element and an outer filter element being aligned according to one embodiment.

FIG. 8B is a cross-sectional view of the inner filter element being moved into the outer filter element of FIG. 8A.

FIG. 8C is a cross-sectional view through section 8C-8C of FIG. 3B.

FIGS. 9A-9D are cross-sectional views of an inner filter element being installed within an outer filter element according to one embodiment.

FIGS. 10A-10C are cross-sectional views of the inner filter element being installed within the outer filter element according to the embodiment shown in FIGS. 9A-9D.

FIG. 13 is a cross-sectional view of a portion of an inner filter element installed within an outer filter element.

DETAILED DESCRIPTION

Referring to the figures generally, various embodiments disclosed herein relate to a filter assembly that comprises a filter housing, an outer filter element, and an inner filter element. The inner filter element is positioned within the outer filter element and comprises an inner top endplate with a top rib. The top rib of the inner filter element facilitates proper installation of the inner filter element into the outer filter element, which ensures a quality filter assembly and also reduces the manufacturing cycle time and production and assembly time, thereby reducing product cost.

Filter Assembly

The filter assembly 20 (as shown in FIGS. 1A-2C) is configured to filter a fluid and comprises a filter housing 22, an outer filter element 30, and an inner filter element 130. The filter assembly 20 may be used for liquid filtration, such for fuel and/or water filtration. Accordingly, the fluid may be, in particular, a liquid such a fuel and/or water.

The filter assembly 20 may have a variety of different filtration configurations. For example, the filter assembly 20 may be a filter-in-filter design or an Advanced Filter Water Separator (FWS). The filter assembly 20 may be designed to work with a top-loading cartridge.

Filter Housing

Figure 2C:
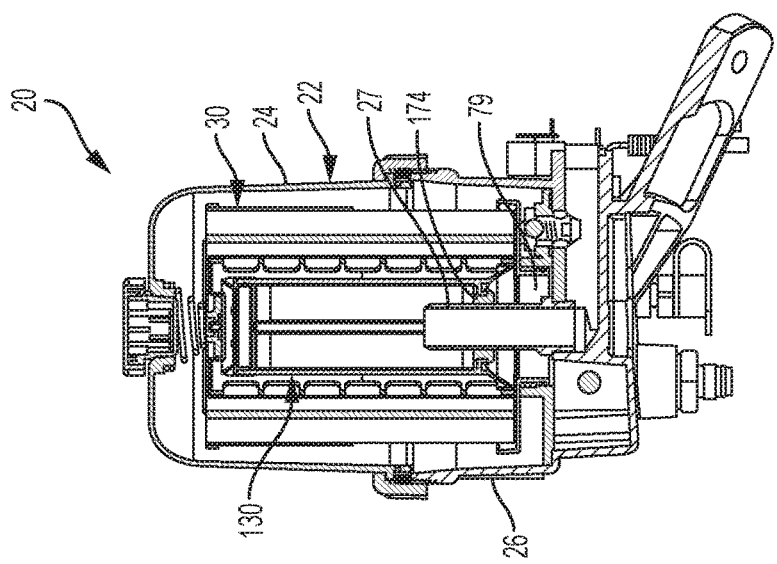
FIG. 2C is another cross-sectional view of FIG. 2A.
Figure 2B:
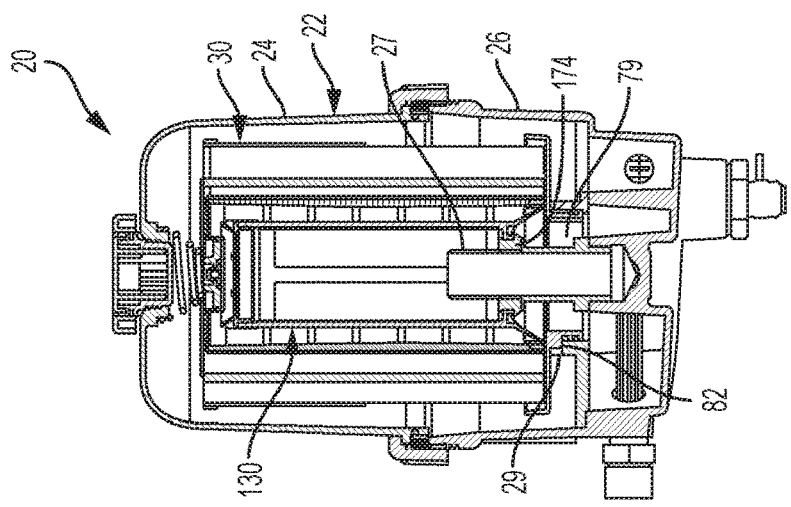
FIG. 2B is a cross-sectional view through section 2B-2B of FIG. 2A.
Figure 2A:
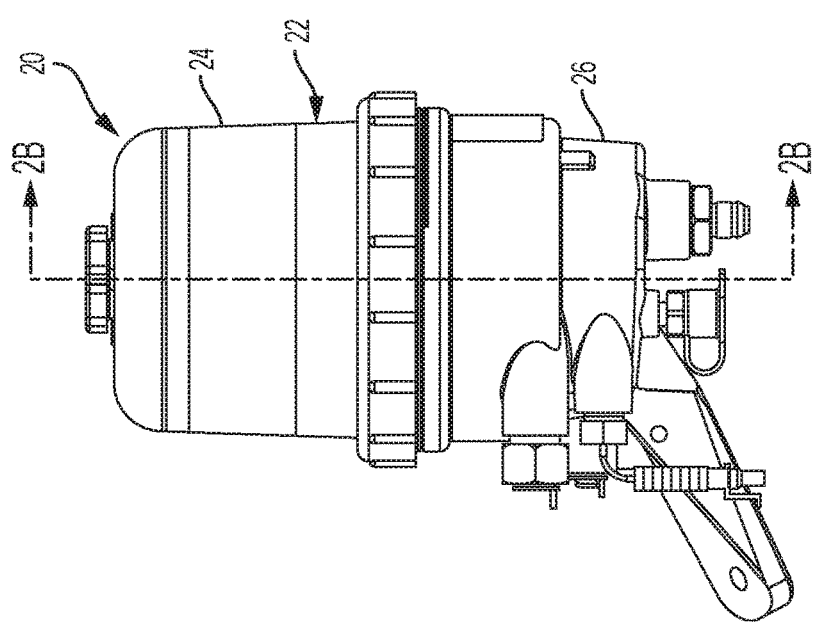
FIG. 2A is a side view of a filter assembly a filter assembly according to one embodiment.

The housing 22 is configured to surround and contain the outer filter element 30 and the inner filter element 130. The housing 22 comprises an upper portion 24 and a lower portion 26 that are configured to attach to each other around the outer filter element 30. As shown in FIGS. 2B and 2C, the outer filter element 30 is positioned within the filter housing 22, and the inner filter element 130 is positioned within the outer filter element 30.

Figure 1B:
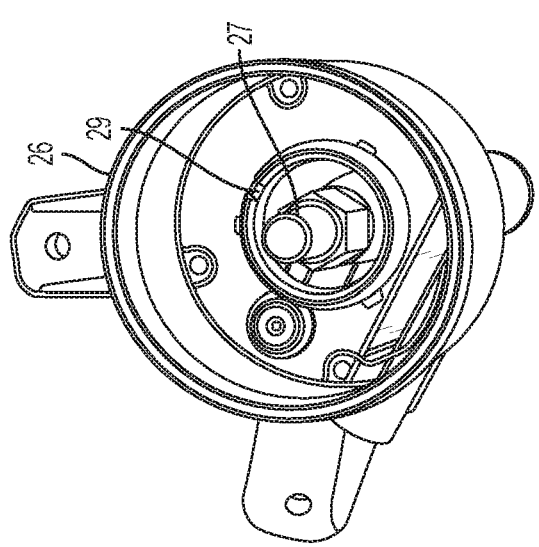
FIG. 1B is a top perspective view of a lower portion of the housing of the filter assembly of FIG. 1A.
Figure 1C:
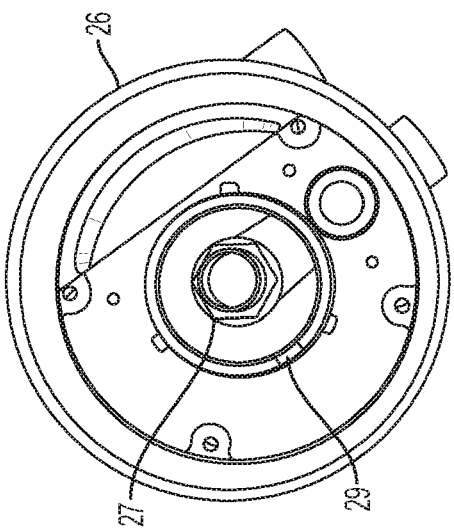
FIG. 1C is a top view of a lower portion of the housing of the filter assembly of FIG. 1A.
Figure 1A:
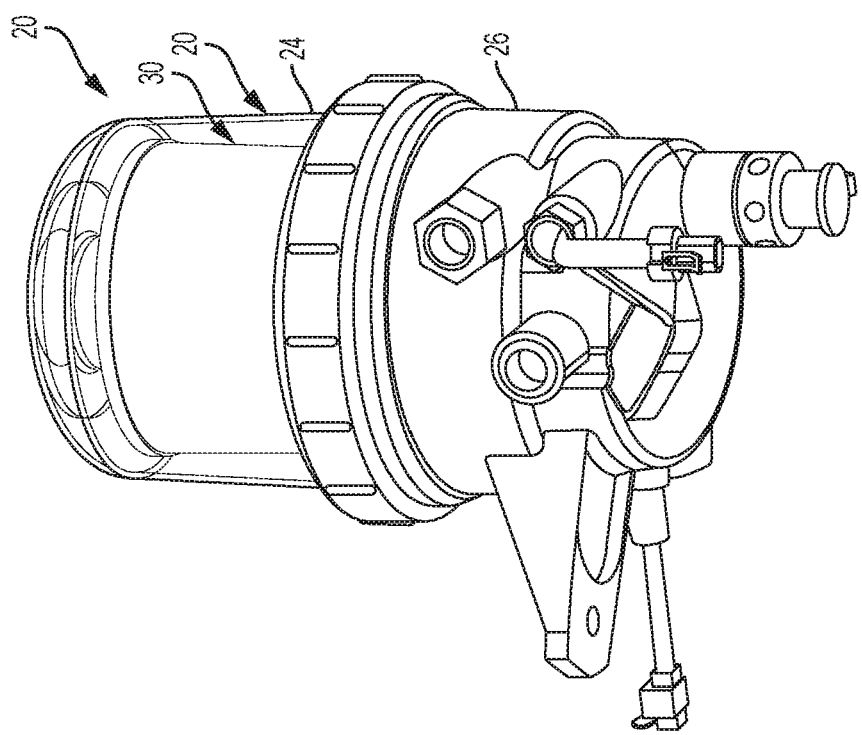
FIG. 1A is a perspective view of a filter assembly according to one embodiment.

As shown in FIGS. 2B-2C, the lower portion 26 of the housing 22 comprises a standpipe 27 that seals with the inner filter element 130, as described further herein. As shown in FIGS. 1B-1C, the lower portion 26 of the housing 22 also comprises an engine integrity protection ("EIP") key feature 29 that is configured to correspond to a tab 82 of the outer filter element 30 when the outer filter element 30 is installed within the housing 22 (as shown in FIG. 2B), as described further herein.

Outer Filter Element

The outer filter element 30 is positionable within the housing 22 and comprises an outer filter media 32 that is configured to filter the fluid. As shown in FIG. 8C, the longitudinal axis 38 of the outer filter element 30 extends through the middle of the outer filter element 30 in the longitudinal direction.

As shown in FIG. 8C, the outer filter element 30 comprises a center tube 34 that extends substantially along the length of the outer filter element 30 within an inner center area of the outer filter media 32. The outer filter element 30 further comprises coalescing media or wrap 36 that extends around the outside of the center tube 34 of the outer filter element 30 and within the inner center area of the outer filter media 32.

The outer filter element 30 also comprises an outer top endcap or endplate 50 and an outer bottom endcap or endplate 70 positioned on the top and bottom, respectively, of the outer filter media 32, the center tube 34, and the coalescing wrap 36.

Figure 3C:
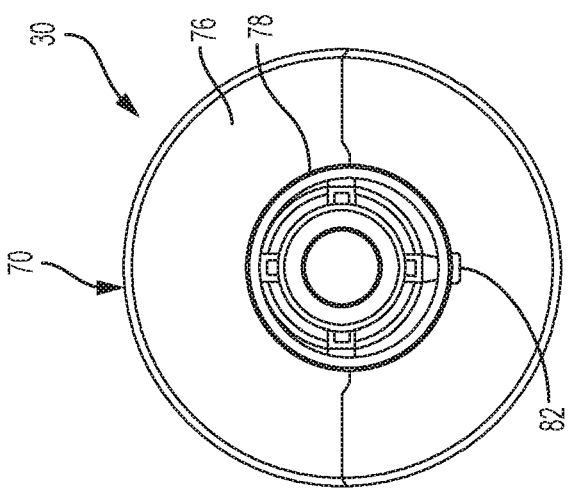
FIG. 3C is a top view of the outer filter element of FIG. 3A.
Figure 3B:
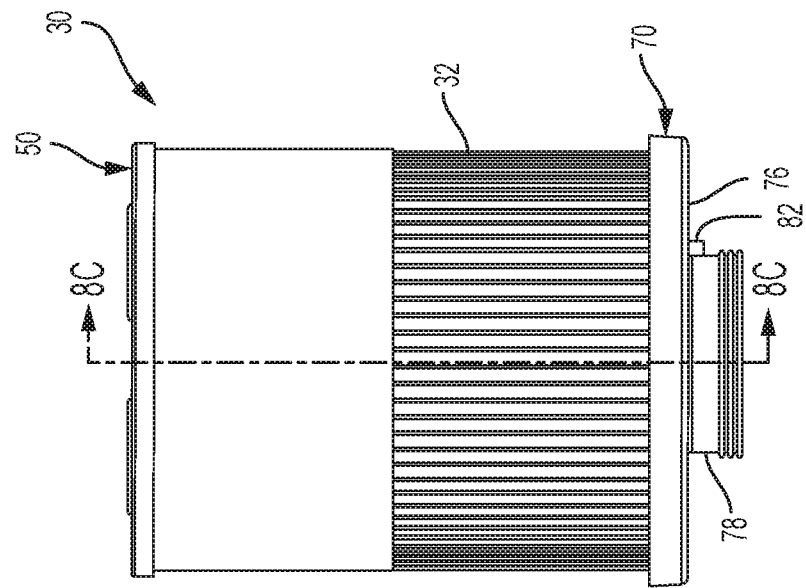
FIG. 3B is a side view of the outer filter element of FIG. 3A with an inner filter element installed within the outer filter element.
Figure 3A:
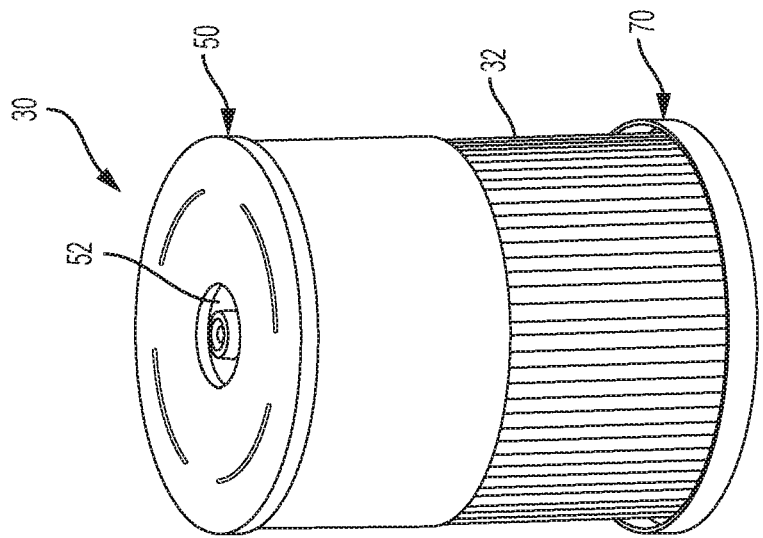
FIG. 3A is a perspective view of an outer filter element according to one embodiment.

As shown in FIGS. 3A and 8C, the outer top endplate 50 comprises a check valve 52 and a corresponding check valve retainer 54 that holds the check valve 52 in the center of the outer top endplate 50. The end 55 of the check valve retainer 54 extends into the inner center area of the outer filter media 32 within the outer filter element 30 (as shown in FIG. 8C).

Figure 4B:
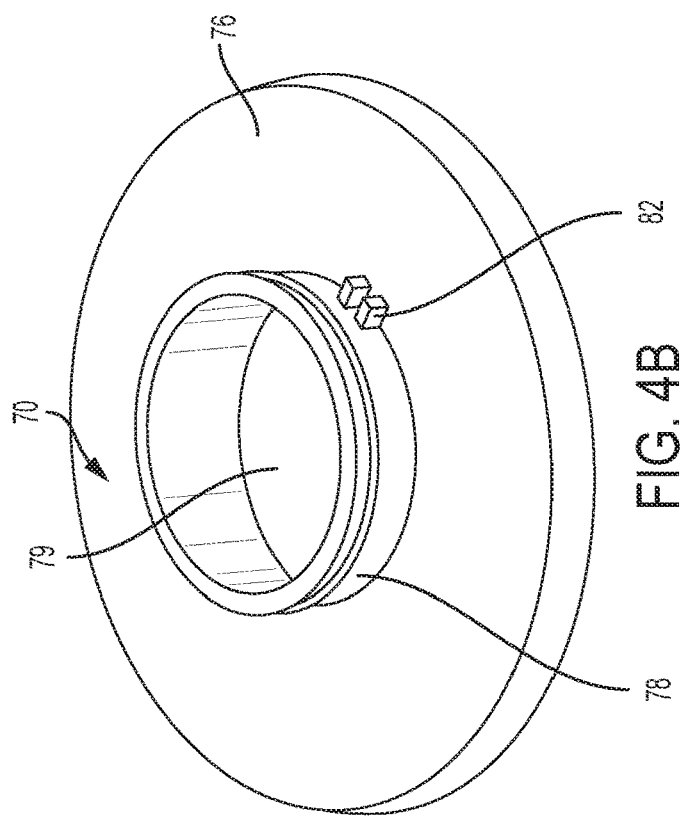
FIG. 4B is a bottom perspective view of the outer bottom endplate of FIG. 4A.
Figure 4C:
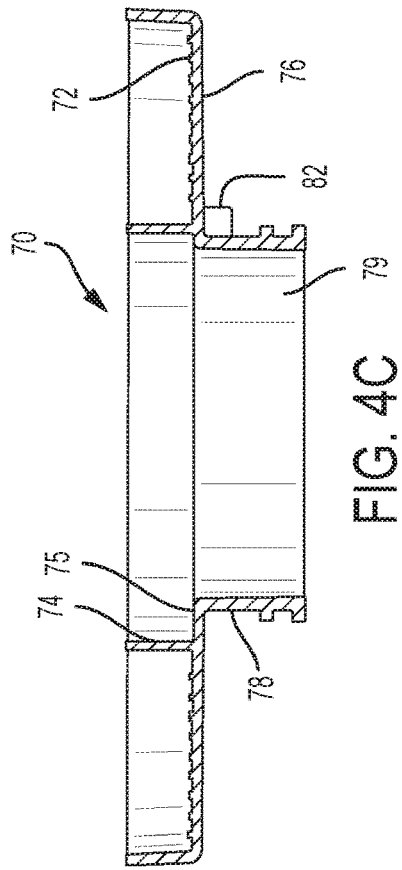
FIG. 4C is a cross-sectional view of the outer bottom endplate of FIG. 4A.
Figure 4A:
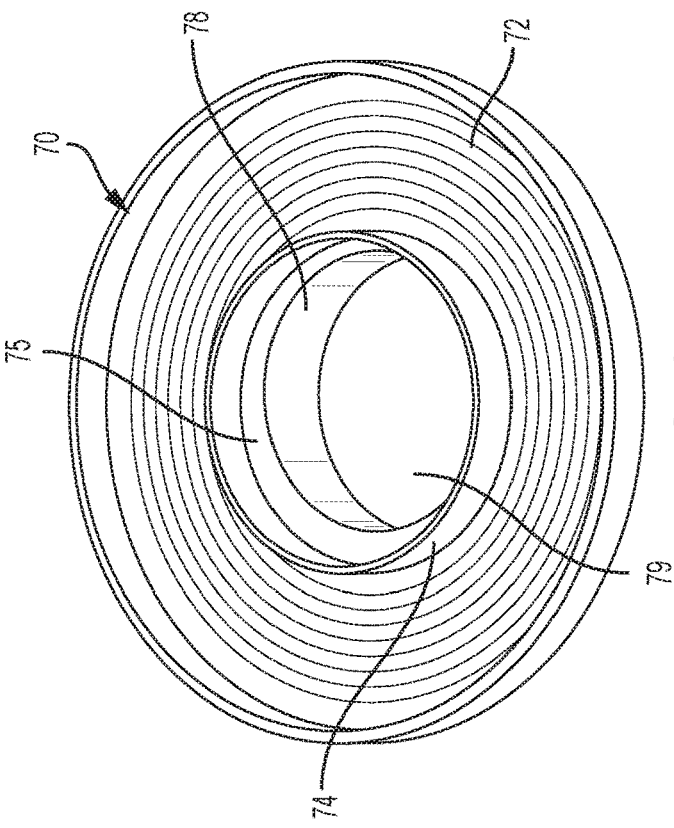
FIG. 4A is a top perspective view of an outer bottom endplate of the outer filter element of FIG. 3A.
Figure 11C:
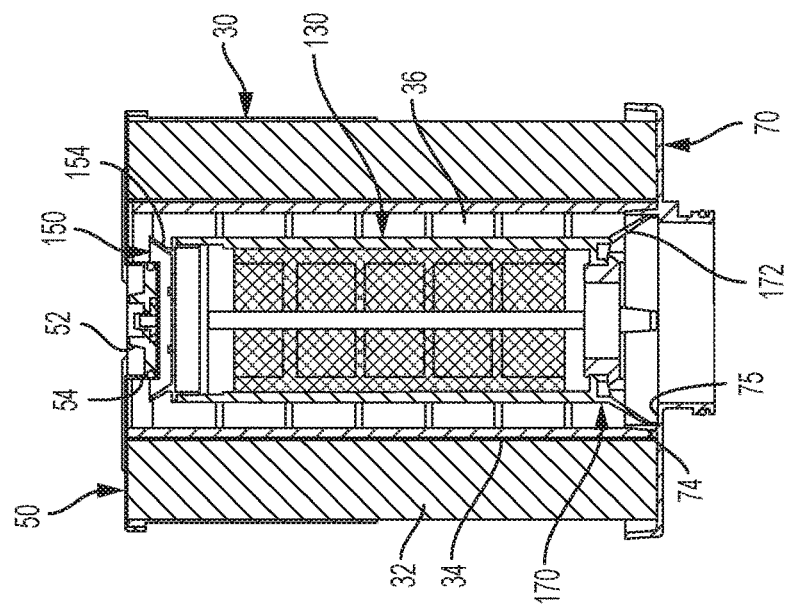
FIGS. 11A-11C are cross-sectional views of an inner filter element being installed within an outer filter element according to another embodiment.
Figure 11B:
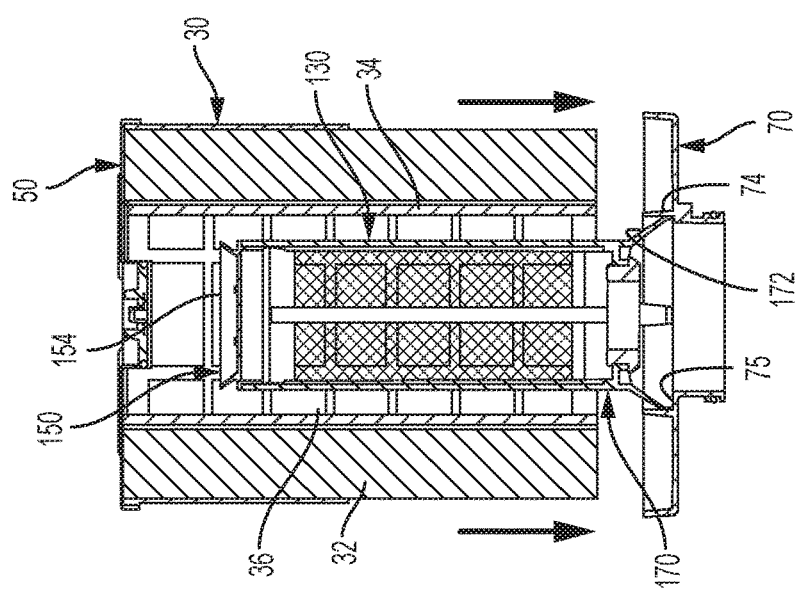
Figure 11A:
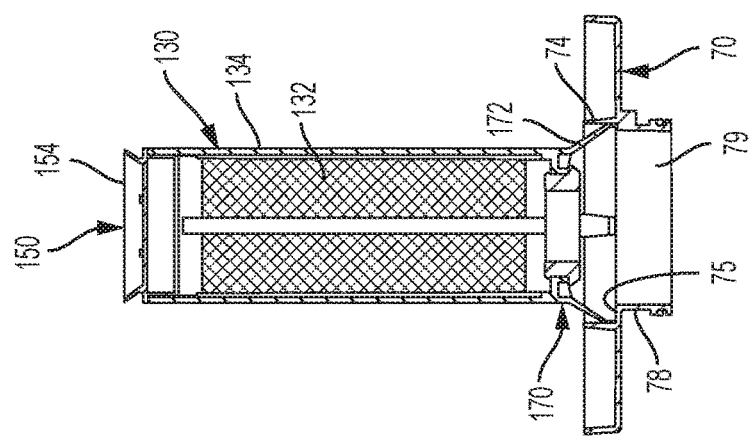
Figure 12C:
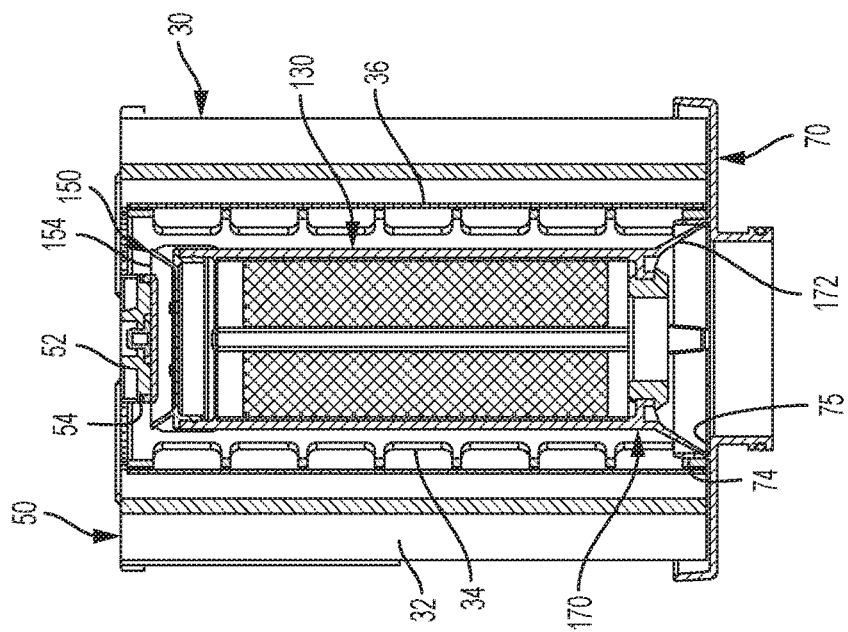
FIGS. 12A-12C are cross-sectional views of the inner filter element being installed within the outer filter element according to the embodiment shown in FIGS. 11A-11C.
Figure 12B:
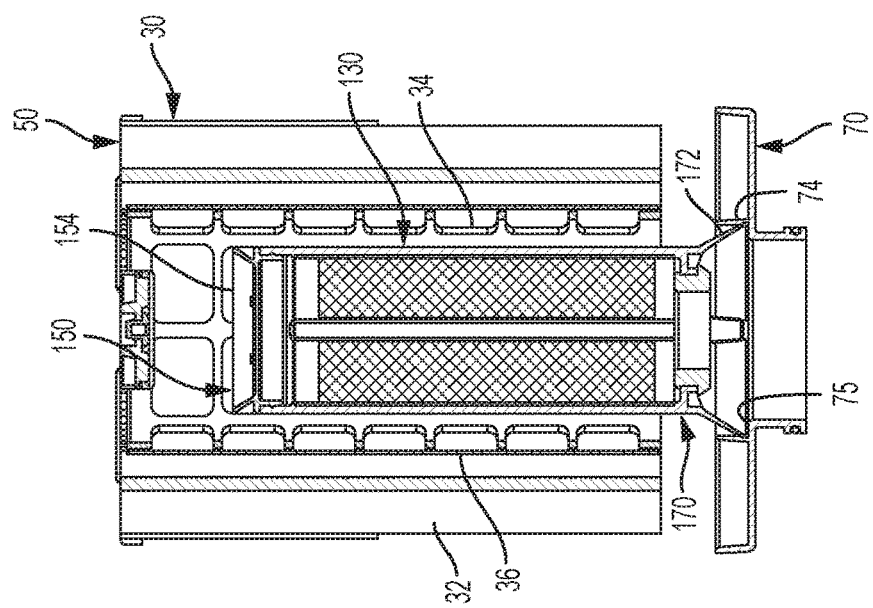
Figure 12A:
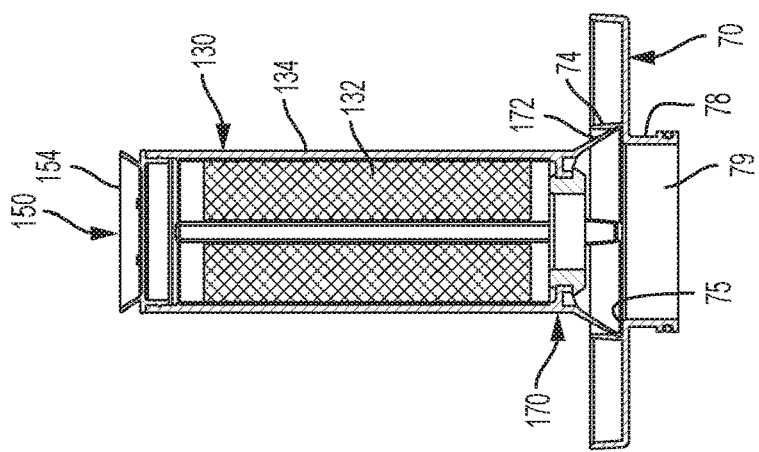

The outer bottom endplate 70 may be attached to the rest of the outer filter element 30 (as shown in FIGS. 8A, 9A, and 10A) or may be separate from (and attachable to) the rest of the outer filter element 30 (as shown in FIGS. 11A and 12A), depending on the desired installation process (as described further herein). As shown in FIGS. 4A-4C, the outer bottom endplate 70 comprises a top surface 72 and a bottom surface 76 on opposite sides. As shown in FIG. 8C, the top surface 72 faces toward the outer filter media 32 (and optionally directly abuts the outer filter media 32) and the bottom surface 76 faces away from the outer filter media 32.

The outer bottom endplate 70 comprises an upper flange that creates a top skirt 74 that extends from the top surface 72 and toward the outer filter media 32. The outer bottom endplate 70 also comprises a lower flange that creates a bottom throat 78 that extends from the bottom surface 76 (in an opposite direction as the top skirt 74) and away from the outer filter media 32. The top skirt 74 extends continuously in a circular manner from the top surface 72 and the bottom throat 78 extends continuously in a circular manner from the bottom surface 76.

The top skirt 74 and the bottom throat 78 together define an aperture 79 that extends through the outer bottom endplate 70 to allow fluid into and out of the outer filter element 30. For example, as described further herein, the inner filter element 130 may be inserted into the outer filter element 30 through the aperture 79.

As shown in FIGS. 4B-4C, the outer bottom endplate 70 comprises a key, micron lockout feature, or tab 82 on the bottom surface 76 of the outer bottom endplate 70. As shown in FIG. 2B, the tab 82 corresponds to and interlocks with the EIP key feature 29 of the lower portion 26 of the housing 22 to ensure that a proper outer filter element 30 is properly positioned within the housing 22. The size of the tab 82 corresponds with the filter micron rating of the EIP key feature 29 on the housing 22 to ensure that the correct outer filter element 30 and housing 22 are being assembled together.

The tab 82 is positioned on the bottom surface 76 of the outer bottom endplate 70 next to and abutting the outside of the bottom throat 78. In order to accommodate the tab 82, the bottom throat 78 is not centered on the outer bottom endplate 70 (however, the top skirt 74 is centered on the outer bottom endplate 70). Accordingly, the top skirt 74 and the bottom throat 78 are not concentric or coaxial and are not aligned with each other as shown in FIG. 4C. The offset between the top skirt 74 and the bottom throat 78 is shown in a side view of the outer filter element 30 (i.e., in a cross-section taken through the tab 82, as shown in FIGS. 9D and 11C, for example). However, the top skirt 74 and the bottom throat 78 are not as offset when the cross-section is taken along a plane perpendicular to the side view of the outer filter element 30, as shown, for example, in FIGS. 10C and 12C. According to one embodiment, the top skirt 74 and the bottom throat 78 are offset by approximately 2.64 millimeters (mm) to accommodate the tab 82.

The inner diameter of the top skirt 74 is greater than the inner diameter of the bottom throat 78. The difference between the inner diameters of the top skirt 74 and the bottom throat 78 (as well as the offset between the top skirt 74 and the bottom throat 78) creates an o-ring resting flange or a resting shelf or flange 75 on the top surface 72 within the outer bottom endplate 70, as shown in FIGS. 4A and 4C. The flange 75 extends between the top skirt 74 and the bottom throat 78. As shown in FIG. 8C and as described further herein, the legs 172 of the inner filter element 130 rests on the resting flange 75 after installation of the inner filter element 130 into the outer filter element 30.

Inner Filter Element

Figure 5C:
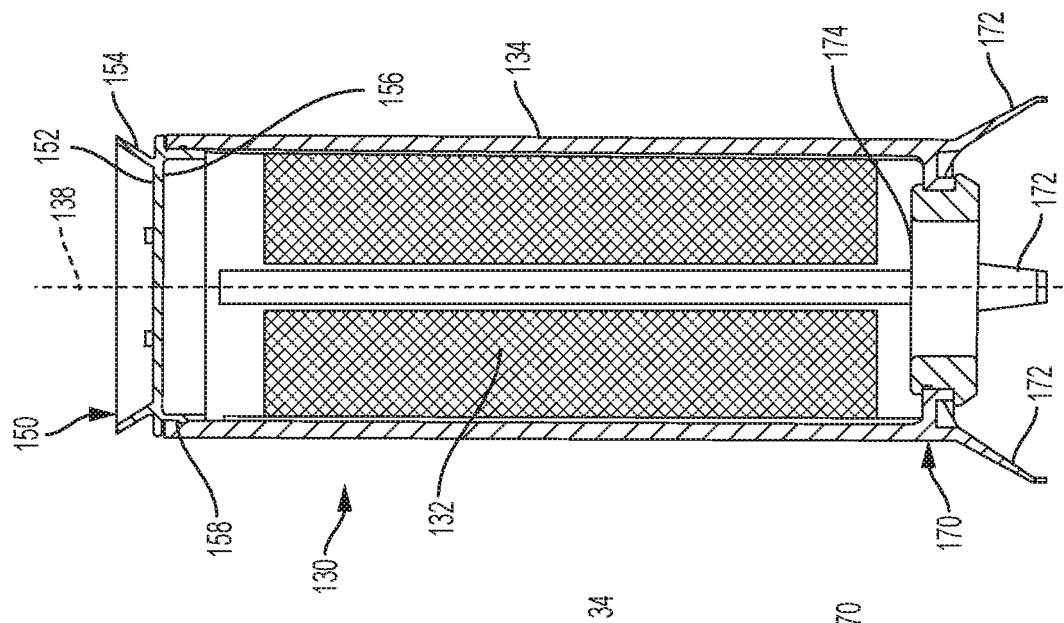
FIG. 5C is a cross-sectional view of the inner filter element of FIG. 5A.

The inner filter element 130 is positionable within or inside the outer filter element 30. As shown in FIGS. 5C and 8C, the longitudinal axis 138 of the inner filter element 130 extends through the middle of the inner filter element 130 in the longitudinal direction.

As shown in FIGS. 5A-5D, the inner filter element 130 comprises an inner filter media 132 that is also configured to filter the fluid and a media support structure 134. According to one embodiment, the inner filter media 132 may comprise a hydrophobic screen and may comprise a filter media that can have any suitable pore size, for example a pore size of 2 to 3 microns. The inner filter media cage or media support structure 134 extends along a portion of the length of the inner filter element 130 and is configured to support and hold the inner filter media 132. The media support structure 134 may be a variety of different materials, such as plastic.

Figure 5B:
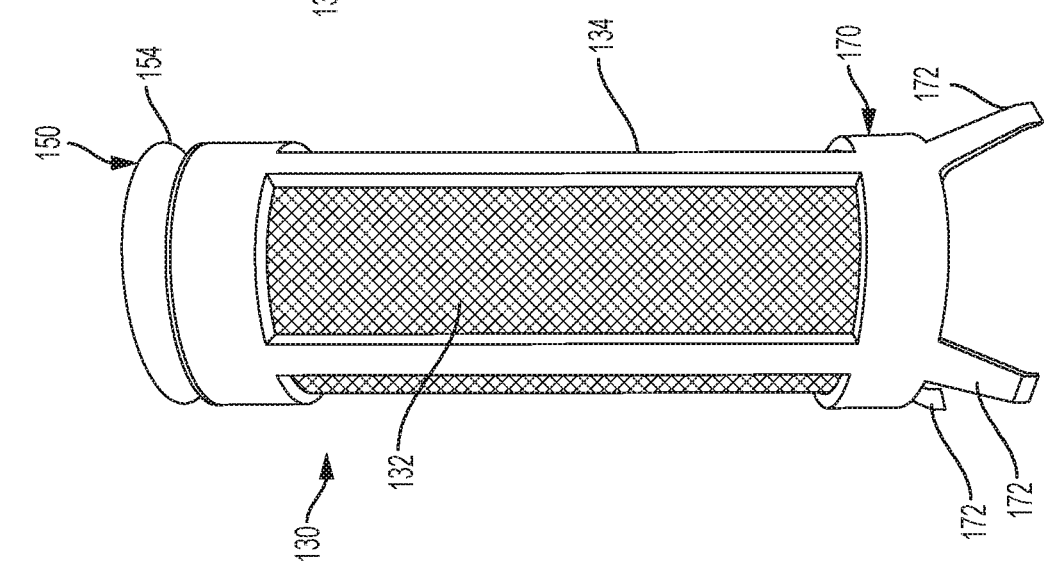
FIG. 5B is a front view of the inner filter element of FIG. 5A.
Figure 5A:
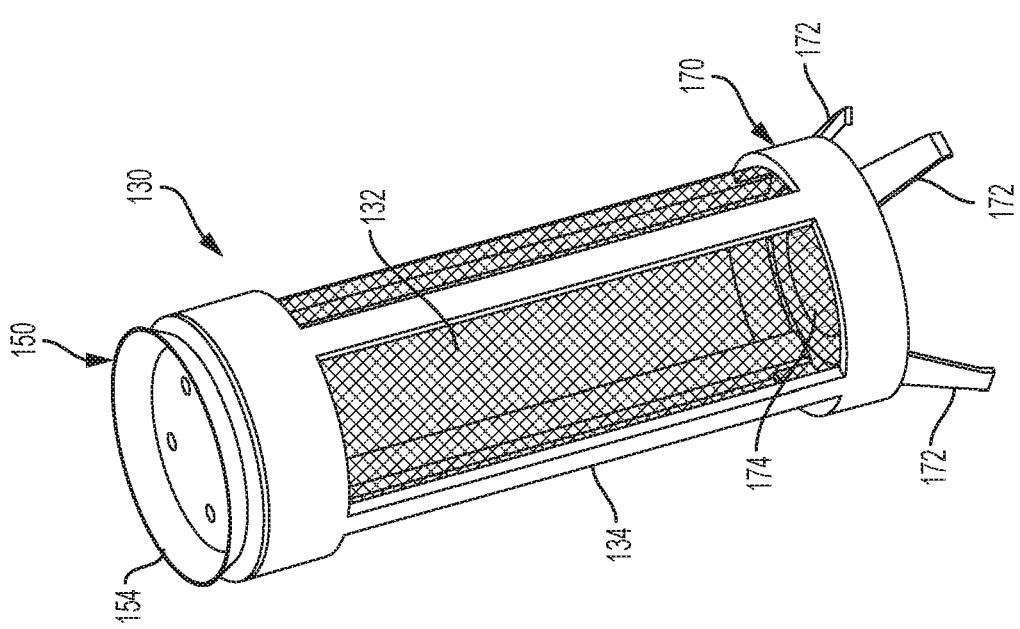
FIG. 5A is a perspective view of an inner filter element according to one embodiment.
Figure 5D:
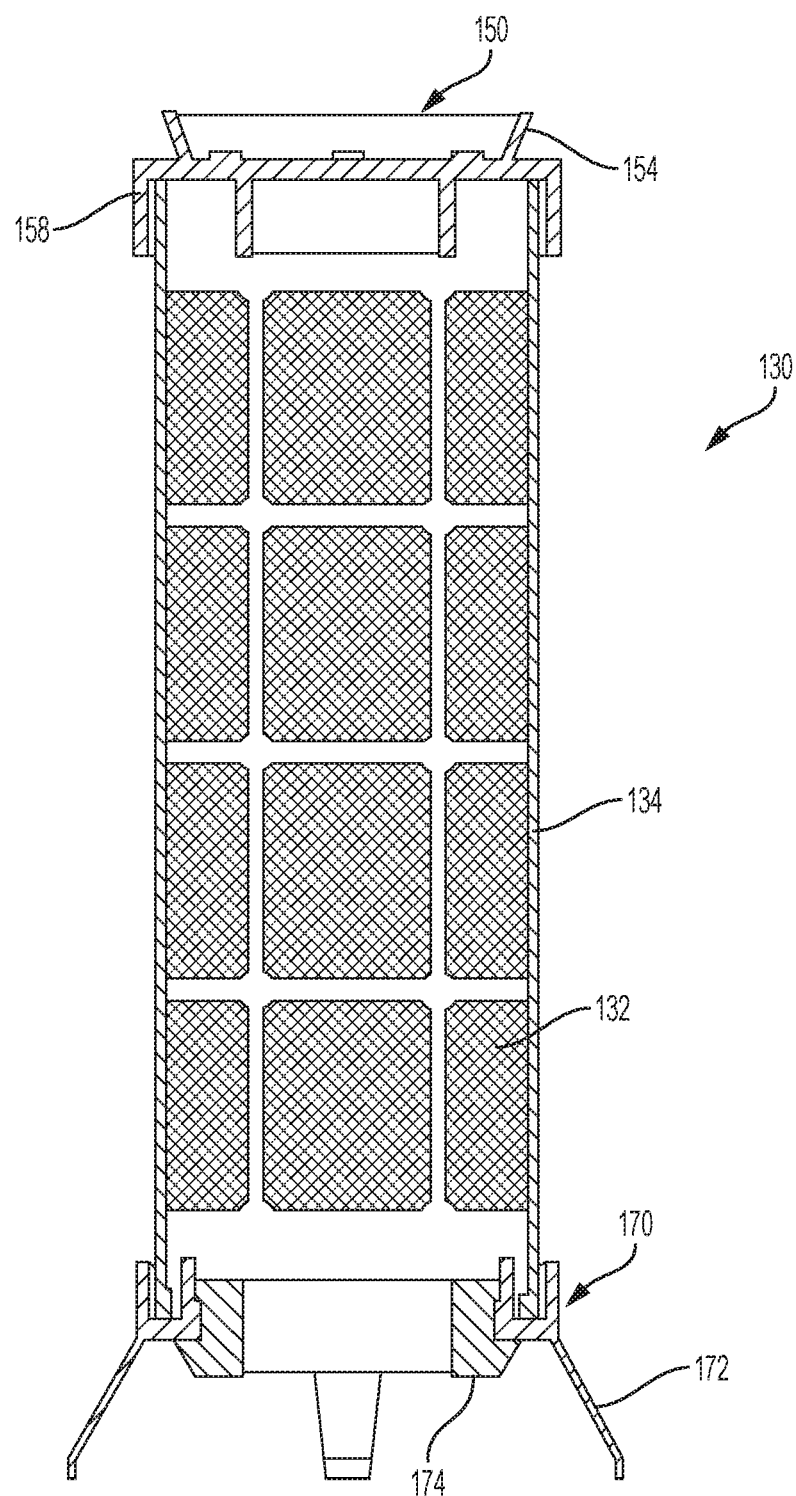
FIG. 5D is a cross-sectional view of an inner filter element according to another embodiment.

According to one embodiment shown in FIGS. 5A-5C, the inner filter media 132 is over-molded to the media support structure 134 such that the inner filter media 132 and the media support structure 134 form an integral, unitary structure with each other that cannot be separated without destruction. According to another embodiment as shown in FIG. 5D, the inner filter media 132 and the media support structure 134 may be separate parts that together create a multi-part structure, such as a three piece structure. For example, the inner filter media 132 may be manually potted with the media support structure 134 with an adhesive (such as, for example, epoxy).

As shown in FIGS. 5A-5D, the inner filter element 130 also comprises an inner top endplate 150 and an inner bottom endplate 170 positioned on the top and bottom, respectively, of the inner filter media 132 and the media support structure 134. In order to assemble the inner filter element 130, the inner top endplate 150 may be pressed into or over top of or attached to the top of the media support structure 134, as shown in FIGS. 5C, 5D, and 7A and as described further herein.

As shown in FIGS. 6A-6F, the inner top endcap or endplate 150 comprises a top surface 152 and a bottom surface 156 on opposite sides thereof. As shown in FIG. 5C, the top surface 152 faces away from the inner filter media 132 and the bottom surface 156 faces toward the inner filter media 132 (and optionally directly abuts the inner filter media 132).

The inner top endplate 150 comprises a top rib 154 that that extends upward from the top surface 152 of the inner top endplate 150. The top rib 154 comprises an inner surface 153 and an outer surface 155. The inner surface 153 is closer to the longitudinal axis 138 of the inner filter element 130. During assembly, the top rib 154 of the inner filter element 130 is first inserted into the outer filter element 30, before the rest of the inner filter element 130 is inserted into the outer filter element 30. When the inner filter element 130 is installed within the outer filter element 30, the inner surface 153 of the top rib 154 is closer to the check valve retainer 54 than the outer surface 155 of the top rib 154 (as shown in FIG. 13).

The top rib 154 also comprises an approximately circular top portion 163 and an approximately circular base portion 165. The top portion 163 is the portion of the top rib 154 that is furthest away from the top surface 152. The base portion 165 is the portion that is closest to and abuts the top surface 152. The base portion 165 extends from the top surface 152.

The top rib 154 extends continuously (e.g., in 360°) around a portion of the top surface 152 of the inner top endplate 150. For example, the top rib 154 extends in approximately a circle from the top surface 152 of the inner top endplate 150. Accordingly, when the inner filter element 130 is installed within the outer filter element 30, the top rib 154 extends completely around at least the end 55 of the check valve retainer 54 and a portion of the length of the check valve retainer 54 (as shown in FIG. 8C). According to one embodiment, the top rib 154 does not have any discontinuities (e.g., divots, notches, incisions, holes, apertures, etc.) and is substantially smooth around its circumference (including along the top portion 163, the base portion 165, and a center portion in between the top portion 163 and the base portion 165).

The top rib 154 is shaped like a partial hollow cone on the top surface 152 of the inner top endplate 150 such that the inner diameter at the base portion 165 of the top rib 154 is smaller than the inner diameter at the top portion 163 of the top rib 154. For example, the base portion 165 of the top rib 154 extends outwardly and upwardly in a circular manner from the top surface 152 of the inner top endplate 150 to the top portion 163 of the top rib 154. Said another way, the top rib 154 tapers inwardly and downwardly from the top portion 163 of the top rib 154 to the base portion 165 of the top rib 154.

The top rib 154 extends from the top surface 152 of the inner top endplate 150 (i.e., from the base portion 165 to the top portion 163) at a constant and nonzero angle relative to the top surface 152 and relative to a longitudinal axis 138 of the inner filter element 130. Accordingly, the base portion 165 of the top rib 154 extends in a substantially straight line from the top surface 152 of the inner top endplate 150 to the top portion 163 of the top rib 154 at a non-perpendicular angle (to the top surface 153 and to the longitudinal axis 138).

According to one embodiment, the top rib 154 extends from the top surface 152 at an angle of approximately 123°, ±3° (referring to the angle between the inner surface 153 of the top rib 154 and the top surface 152 of the inner top endplate 150). The angle of the top rib 154 (and therefore the inner diameter of the top portion 163 of the top rib 154) may be changed depending on the size of the check valve 52 (and therefore the check valve retainer 54). In order to fit around the check valve retainer 54, the inner diameter at the top portion 163 of the top rib 154 is larger than the outer diameter of the check valve retainer 54.

As described further herein, the top rib 154 is a self-guiding feature on the inner top endplate 150 that guides the inner filter element 130 into and within the outer filter element 30 during assembly and thus facilitates proper installation of the inner filter element 130 into the outer filter element 30. For example, the top rib 154 allows the inner filter element 130 to be self-guided as the inner filter element 130 is being inserted into the outer filter element 30 (or as the outer filter element 30 is being placed over top of the inner filter element 130).

As further shown in FIGS. 6A-6F, the inner top endplate 150 also comprises a bottom rib 158 that extends continuously (e.g., in 360°) around and from a portion of the bottom surface 156 of the inner top endplate 150. For example, the bottom rib 158 extends in approximately a circle from the bottom surface 156 of the inner top endplate 150. According to the embodiment shown in FIGS. 5C and 7A, when the inner top endplate 150 is assembled with the media support structure 134, the bottom rib 158 extends into the inside of the media support structure 134 such that a portion of the inner top endplate 150 (i.e., the bottom rib 158) is positioned within the media support structure 134. According to another embodiment shown in FIG. 5D, when the inner top endplate 150 is assembled with the media support structure 134, the bottom rib 158 extends around the outside of the media support structure 134 such that a portion of the media support structure 134 is positioned within the inner top endplate 150 (i.e., within the bottom rib 158).

The bottom rib 158 of the inner top endplate 150 may attach to the media support structure 134 of the inner filter element 130. According to one embodiment, the bottom rib 158 of the inner top endplate 150 and the media support structure 134 may have a plastic-to-plastic sealing interface or a plastic-to-plastic interference fit to attach with each other. Accordingly, as shown in FIGS. 6B, 6E-6F, and 7A-7B, the inner top endplate 150 comprises a circumferential ledge, lip, or bump 159 that extends around the outside surface of the bottom rib 158. As shown in FIG. 7A, the media support structure 134 has a corresponding circumferential groove or indent 139 that extends around the inside surface of the media support structure 134. In order to install or attach the inner top endplate 150 to the media support structure 134, the bottom rib 158 of the inner top endplate 150 is inserted into the media support structure 134 until the bump 159 snaps into the indent 139, thereby attaching (and optionally locking) the inner top endplate 150 and the media support structure 134 together. It is understood that, in an alternative embodiment, the inner top endplate 150 comprises the indent 139 and the media support structure 134 comprises the bump 159.

As shown in FIGS. 5A-5D, the inner bottom endcap or endplate 170 comprises at least one leg 172 that extends away from the inner filter media 132 from a bottom surface of the inner bottom endplate and is angled outwardly relative to the longitudinal axis 138 of the inner filter element 130 and downwardly relative to the bottom surface of the inner bottom endplate. For example, the inner bottom endplate 170 may comprise four legs 172. As shown in FIG. 8C, the legs 172 of the inner filter element 130 stabilize the inner filter element 130 relative to the outer filter element 30 after installation by resting on the resting flange 75 within the top skirt 74 of the outer bottom endplate 70 of the outer filter element 30 when assembled. The legs 172 also center the inner filter element 130 relative to the top skirt 74. As described further herein, the legs 172 help secure the inner filter element 130 within the outer filter element 30 when the inner filter element 130 is installed within the outer filter element 30.

As shown in FIGS. 2B-2C, 5A, 5C, and 5D, the inner bottom endplate 170 comprises a grommet 174 that is configured to seal against the standpipe 27 of the lower portion 26 of the housing 22 once the outer filter element 30 (with the inner filter element 130) is installed within the housing 22. As shown in FIGS. 2B-2C, the standpipe 27 extends through the aperture 79 within the outer bottom endplate 70 of the outer filter element 30 and through the grommet 174 of the inner filter element 130. The grommet 174 is positioned within a region surrounded by the legs 172.

In order to account for the fact that the top skirt 74 and the bottom throat 78 of the outer bottom endplate 70 of the outer filter element 30 are not concentric or coaxial and are not aligned with each other (as described above), the inner filter element 130 is "floating" or can move slightly within the outer filter element 30 after installation of the inner filter element 130 into the outer filter element 30. This may be due to, for example, the inner diameter of the top skirt 74 being larger than the distance between outer surfaces of ends of two opposite legs 172 (while the inner diameter of the bottom throat 78 is smaller than the distance between the outer surfaces of the ends of the two opposite legs 172 in order to retain the inner filter element 130 within the outer filter element 30). This configuration ensures that the inner filter element 130 can align with the standpipe 27 (once the outer filter element 30 (with the inner filter element 130) is installed within the housing 22) and that concentricity between the inner filter element 130 and the standpipe 27 is maintained in order to create a proper and perfect seal between the inner filter element 130 and the standpipe 27. Furthermore, since the inner filter element 130 aligns with the housing 22 through the standpipe 27 and the inner filter element 130 is aligned with the outer filter element 30, the outer filter element 30 is also aligned within the housing 22.

Inner Filter Element Installation

Because the inner filter element 130 is separate from the outer filter element 30 (rather than being potted with the outer filter element 30), the inner filter element 130 is configured to be installed within the outer filter element 30 as shown in FIGS. 8A-12C. As shown in FIGS. 8A-10C and FIGS. 11A-12C, the inner filter element 130 can be installed within the outer filter element 30 in a variety of different manners, and thus the filter assembly 20 can be assembled in a variety of different manners.

In order to assemble the filter assembly 20, the inner filter element 130 is positioned beneath the outer filter media 32, the top rib 154 of the inner top endplate 150 of the inner filter element 130 (and subsequently the inner filter media 132 of the inner filter element 130) is inserted into the outer filter media 32 of the outer filter element 30, and the inner bottom endplate 170 of the inner filter element 130 is attached to the outer bottom endplate 70 of the outer filter element 30. However, the exact order of the individual processes and how the processes are carried out may vary according to the embodiment, as described further herein.

For example, FIGS. 8A-8C, 9A-9D, and 10A-10C each depict one way that the inner filter element 130 can be installed within the outer filter element 30 in which the inner filter element 130 is pushed inside of the entire outer filter element 30. The inner filter element 130 is first aligned with and positioned beneath the outer filter element 30, as shown in FIG. 8A. As shown in FIGS. 8B, 9A, and 10A, the inner filter element 130, in particular the top rib 154 of the inner top endplate 150, is inserted into or moved, slide, or pushed through the aperture 79 of the outer bottom endplate 70 of the outer filter element 30 (while the outer filter element 30 may optionally remain in place) by an operator or press equipment. As the inner bottom endplate 170 of the inner filter element 130 is moved through the aperture 79 and the legs 172 begin to enter into the outer bottom endplate 70 of the outer filter element 30, the bottom throat 78 of the outer bottom endplate 70 flexes, compresses, or presses the legs 172 inwardly (toward the longitudinal axis 138 of the inner filter element 130 and in the direction of the arrows as shown in FIGS. 9B and 10B). Accordingly, the legs 172 of the inner filter element 130 are compressed inwardly during installation and assembly while the legs 172 are being moved through the bottom throat 78 of the aperture 79 of the outer bottom endplate 70 of the outer filter element 30 in order to fit the inner filter element 130 through the outer bottom endplate 70 of the outer filter element 30 and to facilitate installation, as shown in FIG. 9C.

The inner filter element 130 is pressed into the outer filter element 30 until the legs 172 of the inner bottom endplate 170 are within and snap into the top skirt 74 of the outer bottom endplate 70 of the outer filter element 30. In this position (i.e., after the legs 172 are moved through the bottom throat 78 of the aperture 79), the legs 172 automatically move or expand outwardly into a relaxed state within the top skirt 74 of the aperture 79 and on top of the resting flange 75 (as shown in FIGS. 9D and 10C), which keeps the inner filter element 130 installed within the outer filter element 30. Accordingly, the inner filter element 130 (in particular the top rib 154) is inserted fully into the outer filter element 30 and the inner bottom endplate 170 of the inner filter element 130 is attached to the outer bottom endplate 70 of the outer filter element 30 after the outer bottom endplate 30 is attached to the rest of the outer filter element 30. Since the inner diameter of the aperture 79 along the top skirt 74 is larger than the inner diameter along other portions of the aperture 79 (such as the bottom throat 78), the top skirt 74 allows the legs 172 to expand outwardly from the longitudinal axis 138 of the inner filter element 130 to approximately their original angle (relative to the longitudinal axis 138) in the relaxed state and the legs 172 may abut the top skirt 74 and the resting flange 75 of the outer bottom endplate 70. The resting flange 75 on the top surface 72 of the outer bottom endplate 70 prevents the legs 172 (and the rest of the inner filter element 130) from moving out of the outer filter element 30. Accordingly, in this relaxed state and position, the inner filter element 130 is completely pushed through the outer bottom endplate 70 and is then in place and completely installed within the outer filter element 30.

FIGS. 11A-11C and 12A-12C each depict another way that the inner filter element 130 can be installed within the outer filter element 30 in which a portion of the outer filter element 30 is pushed over the top of the inner filter element 130 and another portion of the outer filter element 30 is pushed over the bottom of the inner filter element 130 such that the inner filter element 130 and the outer filter element 30 are assembled inside-out. More specifically, as shown in FIGS. 11A-11B and 12A-12B, the outer bottom endplate 70 of the outer filter element 30 is first separate from the rest of the outer filter element 30 before and while the top rib 154 of the inner top endplate 150 is being inserted into the outer filter media 32 of the outer filter element 30. Accordingly, the inner bottom endplate 170 of the inner filter element 130 is attached to, placed in position on, installed on, or potted onto the outer bottom endplate 70 of the outer filter element 30 before the outer bottom endplate 70 is attached to the rest of the outer filter element 30 (i.e., without the rest of the outer filter element 30 attached yet) and before the inner filter element 130 (in particular the top rib 154) is inserted fully (or partially) into the outer filter element 30, as shown in FIGS. 11A and 12A. According to one embodiment, the legs 172 may be inserted into the top skirt 74 through the top of the outer bottom endplate 70 such that the inner filter element 130 does not move at all through the bottom throat 78 of the aperture 79 (and while the outer bottom endplate 70 is not attached to the rest of the outer filter element 30). According to another embodiment, the inner filter element 130 is inserted through the bottom throat 78 and the top skirt 74 to position the legs 172 within the top skirt 74 while the outer bottom endplate 70 is not attached to the rest of the outer filter element 30. Once the inner bottom endplate 170 of the inner filter element 130 is attached to the outer bottom endplate 70 of the outer filter element 30, the legs 172 of the inner bottom endplate 170 of the inner filter element 130 are positioned on the outer bottom endplate 70 in their relaxed state within the top skirt 74 of the outer bottom endplate 70 and are resting on the resting flange 75 of the outer bottom endplate 70 (as described above).

As shown in FIGS. 11B and 12B, after the inner bottom endplate 170 of the inner filter element 130 is attached to the outer bottom endplate 70 of the outer filter element 30, the inner filter element 130 is aligned with and positioned beneath the rest of the outer filter element 30, and the rest of the outer filter element 30 (e.g., the outer filter media 32, the center tube 34, the coalescing wrap 36, and the outer top endplate 50) is subsequently pushed on top of, slid over, or potted over the top rib 154 of the inner filter element 130 and attached or potted to and sealed with the outer bottom endplate 70 (while the inner filter element 130 (in particular the legs 172) and the outer bottom endplate 70 remain attached to each other and further may optionally remain in place and after the top rib 154 (and the inner filter media 132) of the inner top endplate 150 of the inner filter element 130 is inserted into the outer filter media 32 of the outer filter element 30). Alternatively said, the top rib 154 of the inner filter element 130 (with the outer bottom endplate 70 attached to the inner bottom endplate 170), and subsequently the inner filter media 132, is inserted into the outer filter media 32 of the outer filter element 30. The inner filter element 130 is then in place and installed within the outer filter element 30 once the entire outer filter element 30 is assembled together over the inner filter element 130, as shown in FIGS. 11C and 12C.

Once the inner filter element 130 is completely installed within the outer filter element 30, the top rib 154 of the inner top endplate of the inner filter element 130 completely surrounds the end 55 of the check valve retainer 54 and a portion of the length of the check valve retainer 54. At least a portion of the top rib 154 (e.g., the top portion 163 and at least a portion of the inner surface 153 of the top rib 154) overlaps the end 55 (and a portion of the length) of the check valve retainer 54 along the longitudinal, lengthwise direction of the filter assembly 20. There is a clearance or gap between the inner surface 153 of the top rib 154 on the inner top endplate 150 of the inner filter element 130 and the check valve retainer 54 on the outer top endplate 50 of the outer filter element 30, as shown in FIG. 13. According to one embodiment, this clearance may be approximately 5 mm.

Throughout the installation process (regardless of which installation process is used), the top rib 154 helps guide and facilitate the proper installation of the inner filter element 130 within the outer filter element 30, protects the outer filter element 30 from being damaged during the installation process, and ensures that there are no defects or errors by allowing the inner filter element 130 to automatically and easily self-align within the outer filter element 30 during installation. Even if the longitudinal axis 138 of the inner filter element 130 is angled within the outer filter element 30 relative to the longitudinal axis 38 of the outer filter element 30 during installation, the top rib 154 ensures that the inner filter element 130 does not damage the outer filter element 30 and also properly realigns the inner filter element 130 within the outer filter element 30. For example, if the inner filter element 130 touches the inside of the outer filter element 30 during installation, the inner filter element 130 simply slides along the outer filter element 30 without damaging the outer filter element 30 due to the configuration of the top rib 154 (instead of getting stuck on or damaging the outer filter element 30). The top rib 154 functions as a "poke yoke" within the filter assembly 20 by preventing inadvertent errors during the assembly and installation of the inner filter element 130 within the outer filter element 30.

Specifically, due to the configuration of the top rib 154, the top rib 154 guides the rest of the inner filter element 130 and prevents the inner filter element 130 from getting jammed on or trapped with various components of the outer filter element 30. For example, the top rib 154 prevents the inner filter element 130 from getting stuck on the check valve retainer 54, the center tube 34, or the coalescing wrap 36 of the outer filter element 30. If the inner filter element 130 comes into contact with the check valve retainer 54 of the outer top endplate 50 of the outer filter element 30, the angled inner surface 153 of the top rib 154 slides along the check valve retainer 54 such that the check valve retainer 54 moves from the top portion 163 of the top rib 154 to the base portion 165 of the top rib 154. This motion automatically realigns and recenters the longitudinal axis 138 of the inner filter element 130 to the longitudinal axis 38 of the outer filter element 30 and maintains the concentricity between the top rib 154 and the check valve retainer 54 (as shown in FIG. 8C). Since the top rib 154 extends in a continuously in an approximate circle, the top rib 154 also prevents the inner filter element 130 from getting stuck on the center tube 34 of the outer filter element 30 during installation. Additionally, the top rib 154 prevents the inner filter element 130 from pinching off any of the coalescing wrap 36 of the outer filter element 30 during installation.

Accordingly, due to the top rib 154, the inner filter element 130 can be easily and more quickly installed within the outer filter element 30 in one attempt and the inner filter element 130 automatically falls into place within the outer filter element 30 as the inner filter element 130 is installed within the outer filter element 30, which reduces the manufacturing cycle time.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly, comprising:
an outer filter element comprising:
an outer filter media;
a first endplate disposed on a first end of the outer filter media, the first endplate defining a depression extending towards the outer filter media, the depression structured to retain a valve;
a second endplate disposed on a second end of the outer filter media opposite the first end;
a throat extending axially from the second endplate away from the outer filter media, a central axis of the throat being radially offset from a longitudinal axis of the filter assembly; and
at least one keying structure disposed on the second endplate and abutting an outside surface of the throat, the keying structure configured to engage a key feature of a housing within which the filter assembly is installed; and
an inner filter element disposed within the outer filter element, the inner filter element comprising:
an inner filter media; and
an inner first endplate coupled to a first end of the inner filter media proximate to the first endplate of the outer filter element, the inner first endplate comprising a circumferential rib extending from the inner first endplate towards the first endplate, the circumferential rib lacking flow passages therethrough along the axial length thereof from a top surface of the inner first endplate to a top portion of the circumferential rib furthest away from the top surface, the circumferential rib extending continuously in 360° around a portion of the top surface of the inner first endplate such that at least a portion of the circumferential rib is disposed circumferentially around the depression.

2. The filter assembly of claim 1, wherein the keying structure comprises a tab positioned on a surface of the second endplate.

3. The filter assembly of claim 2, wherein the tab extends radially from a base of the throat.

4. The filter assembly of claim 2, wherein the tab comprises a rectangular protrusion.

5. The filter assembly of claim 1, wherein the second endplate defines an opening, the throat extending from an inner circumferential surface of the opening.

6. The filter assembly of claim 1, wherein the throat defines a groove on a radially outer surface thereof, and further comprising an O-ring disposed in the groove.

7. The filter assembly of claim 1, wherein the second endplate comprises a skirt extending axially from the second endplate towards the outer filter media.

8. The filter assembly of claim 7, wherein the skirt is not concentric with the throat.

9. The filter assembly of claim 7, wherein an inner diameter of the skirt is larger than an inner diameter of the throat.

10. The filter assembly of claim 9, wherein the second end plate comprises a flange extending between the skirt and the throat.

11. The filter assembly of claim 1, wherein:
a central channel is defined and extends axially through the outer filter media, and the inner filter media disposed within the central channel.

12. The filter assembly of claim 11, wherein the inner filter media is coupled to a media support structure disposed in the central channel.

13. The filter assembly of claim 12, further comprising an inner second plate coupled to a second end of the inner filter media opposite the first end of the inner filter media.

14. The filter assembly of claim 1, further comprising a center tube extending along the length of the outer filter media within an inner center area of the outer filter media.

15. The filter assembly of claim 14, further comprising a wrap disposed within the inner center area and coupled to the center tube.

16. A method, comprising:
providing a housing for a filter assembly, the housing having a first portion and a second portion configured to be coupled to each other to define an inner volume for receiving the filter assembly, the second portion defining a key receiving feature;
providing a filter assembly, comprising:
an outer filter element comprising:
an outer filter media,
a first endplate disposed on a first end of the outer filter media, the first endplate defining a depression extending towards the outer filter media, the depression structured to retain a valve,
a second endplate disposed on a second end of the outer filter media opposite the first end,
a throat extending axially from the second endplate away from the outer filter media, a central axis of the throat being radially offset from a longitudinal axis of the filter assembly, and
at least one keying structure disposed on the second endplate and abutting an outside surface of the throat; and
an inner filter element disposed within a central channel of the outer filter element, the inner filter element comprising:
an inner filter media; and
an inner first endplate coupled to a first end of the inner filter media proximate to the first endplate of the outer filter element, the inner first endplate comprising a circumferential rib extending from the inner first endplate towards the first endplate, the circumferential rib lacking flow passages therethrough along the axial length thereof from a top surface of the inner first endplate to a top portion of the circumferential rib furthest away from the top surface, the circumferential rib extending continuously in 360° around a portion of the top surface of the inner first endplate such that at least a portion of the circumferential rib is disposed circumferentially around the depression; and
installing the filter assembly within the housing such that keying structure engages the key feature of the housing.

17. The method of claim 16, wherein the keying structure comprises a tab positioned on a surface of the second endplate.

18. The method of claim 16, wherein the tab extends radially from a base of the throat.

19. The method of claim 16, wherein the second endplate defines an opening, the throat extending from an inner circumferential surface of the opening.

20. The method of claim 19, wherein:
the second portion of the housing comprises a standpipe configured to be inserted through the opening into a central channel defined by the inner filter media when the filter assembly is installed in the housing.

* * * * *